May 6, 1930.  P. J. McCULLOUGH  1,757,323
CAR SUPPORT
Filed July 22, 1929   2 Sheets-Sheet 1

Witness:
RBDavion.

Inventor:
Paul J. McCullough
By Wilkinson Huxley Byron & Knight
Attys.

May 6, 1930. P. J. McCULLOUGH 1,757,323
CAR SUPPORT
Filed July 22, 1929 2 Sheets-Sheet 2
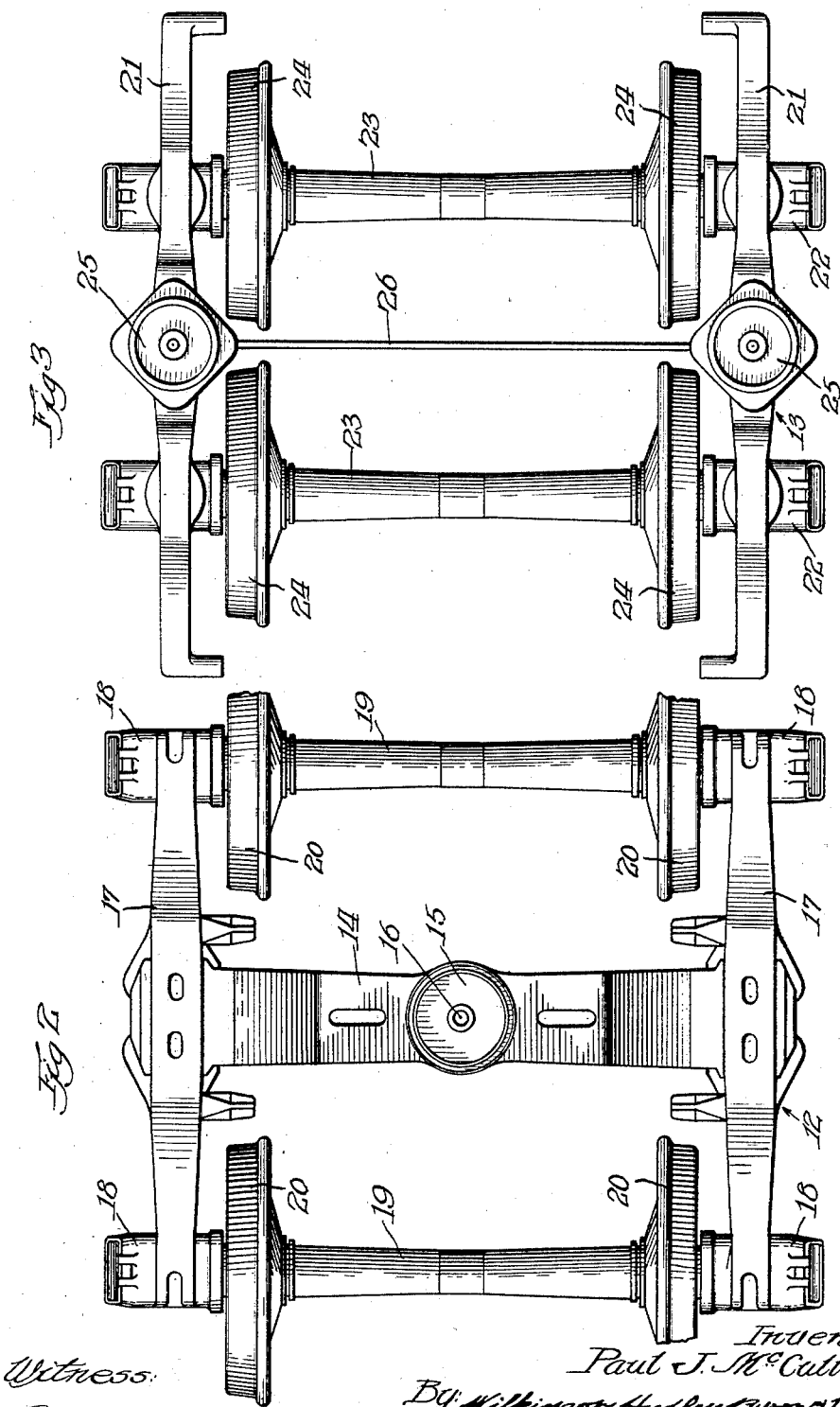

Patented May 6, 1930

1,757,323

UNITED STATES PATENT OFFICE

PAUL J. McCULLOUGH, OF ST. LOUIS, MISSOURI, ASSIGNOR TO SCULLIN STEEL COMPANY, OF ST. LOUIS, MISSOURI, A CORPORATION OF DELAWARE

CAR SUPPORT

Application filed July 22, 1929. Serial No. 380,213.

This invention relates to improvements in railway car construction and more particularly to the supporting means therefor. It has been a customary practice to use center bearing trucks at the front and rear ends of a car whereby the car is normally supported at two points. A car so constructed has a tendency to roll from side to side and this movement is limited by providing side bearings on the truck bolsters. The truck side bearings are, however, normally out of contact with the corresponding bearings fixed to the car body. It has also been proposed to use a centerless truck having side bearings carried by side frames, pivotally connected to the car, to receive the weight of the car body. In this construction, the car is supported at four points. Since the car is substantially rigid any vertical movement, or rolling, of the car will result in an unequal distribution of weight at the bearing points. The trucks in this design are so constructed that the side bearings are fixed points relative to the car, but the wheel axles of the truck itself may move relative to the car in rounding curves.

It is the purpose of the present invention to improve upon the present types of supporting means for railway cars by providing three points of support which may be attained by utilizing a center bearing truck at one end of the car and a centerless side bearing truck at the opposite end of the car. This construction will substantially eliminate the tendency of the car to roll and would do away with the side bearings used with the center bearing truck.

Further and additional objects and advantages of the present improvements will be more readily apparent from the following description taken in connection with the attached drawings in which—

Figure 2 is a plan elevation of one of the car trucks;

Figure 3 is a plan elevation of the other of the car trucks.

Figure 1:
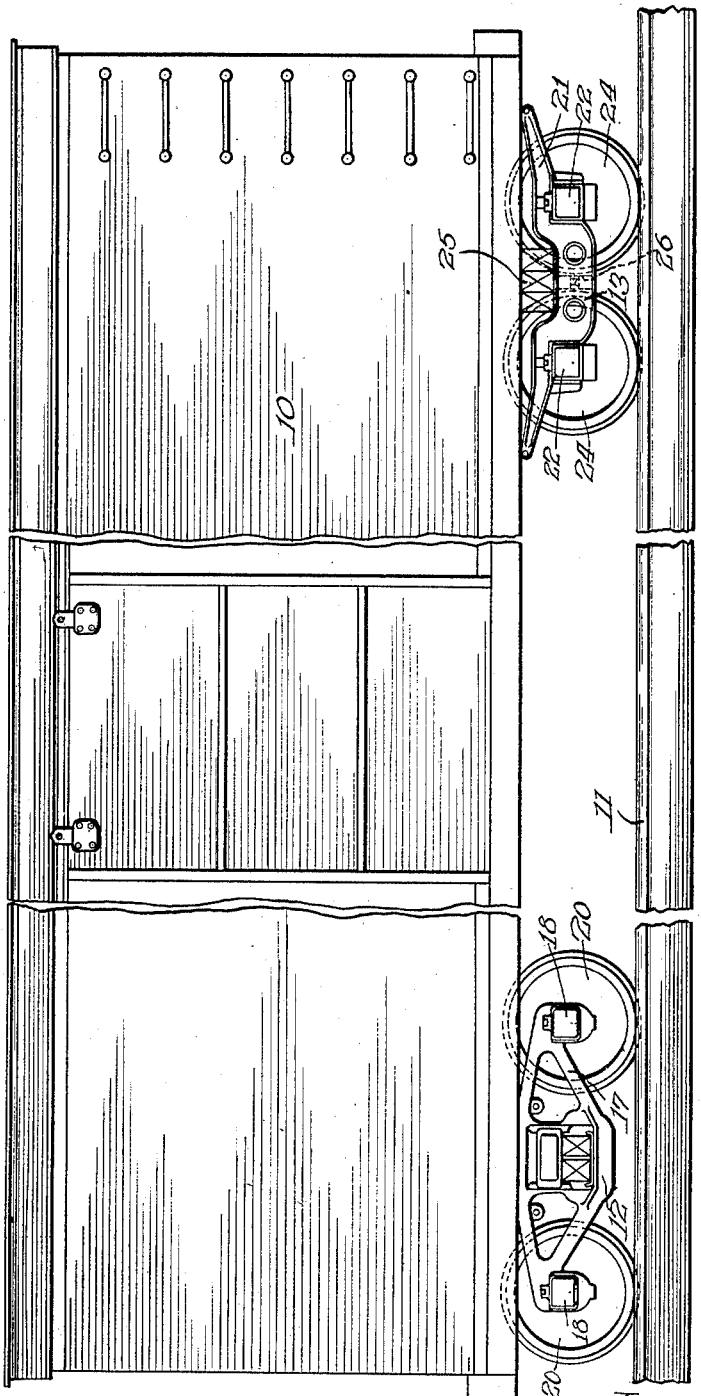
Figure 1 is a side elevation of a railway car supported in the improved manner in which the car is broken longitudinally.

In the drawings, a car body 10 is illustrated which may be of any standard construction. Rails upon which the car travels are indicated at 11. At one end, the car is supported by a truck generally designated 12 and at the other end by a truck generally designated 13. The truck 12 is illustrated in detail in Figure 2 and includes the usual bolster 14 having a center bearing 15 and a pivot bearing 16. Side frames 17 are suitably connected to the ends of the truck bolster. At the ends of the side frames 17 are carried the journal boxes 18 which support the axles 19. Upon the axles 19 are mounted the car wheels 20. It will be apparent that the truck 12 carries the weight of the car by the center bearing 15 and the entire truck may pivot at the pivot bearing 16 relatively to the car.

The other truck 13 is shown in detail in Figure 3 and comprises side frames 21 carrying journal boxes 22 which receive the axles 23. The journal boxes are pivoted to the side frames. Upon the axles 23 are mounted the car wheels 24. At the middle points of the side frames are mounted the side bearings 25 which are pivoted to the car underframe or to a body bolster. The side frames 21 are connected by the cross member 26, which is pivotally connected to each side frame. There is no center bearing or center pivot point in this truck. Thus, the weight of the car is carried by the two side bearings 25 which are pivoted relative to the car. Turning movement of the truck 13 relative to the car when rounding a curve is permitted by the pivotal mounting of the journal boxes 22.

Therefore, in the complete construction, the car is supported at three points. The side bearing points eliminate the rolling tendency of the car. A three-point support will provide a more stable construction and will permit a more even distribution of weight than a four-point support. The usual side bearings in the center bearing truck may be substantially eliminated and only extreme rolling of the car prevented. It will be apparent that although I have described a preferred embodiment of the present improvements that many modifications and changes may be resorted to without departing from the spirit of the invention as expressed in the appended claims.

I claim:

1. In combination, a car, a rigid truck frame comprising side frames and a transverse bolster, said truck frame having a center pivot bearing and supporting one end of said car, a flexible truck frame comprising side frames connected by a pivoted tie rod, said flexible truck frame having side frame pivot bearings supporting the other end of said car.

2. In railway car construction, a car body, supporting means for said car body, said means comprising a truck at each end of said car, one of said trucks including a center pivot bearing support and the other of said trucks including a pair of side pivot bearing supports, the pivotal axes of all three of said supporting bearings being parallelly disposed.

3. In railway car construction, a car body, supporting means for said car body, said means comprising a pair of trucks, one at each end of the car, arranged to carry equal portions of the weight of the car, one of said trucks including a central pivot bearing support and the other of said trucks including a pair of pivoted side bearing supports whereby the car is supported at three points arranged in the form of a triangle.

4. In railway car construction, a car body, a pair of four wheel trucks for supporting said car body, one of said trucks comprising a transverse bolster having a center pivot bearing support and side frames carrying the wheel axles, the other of said trucks including side frames carrying the wheel axles and side bearing supports for the car body carried by said side frames, the pivotal axes of said side bearing supports being perpendicular to the plane of the truck.

5. In combination, a railway car body, means supporting one end of said car at a single point and independent means supporting the other end of said car at two spaced points, each of said supporting points comprising a bearing pivoted about an axis perpendicular to the plane of the bottom of said car.

Signed at St. Louis, Missouri, this 15th day of July, 1929.

PAUL J. McCULLOUGH.